United States Patent
Hopkins et al.

(10) Patent No.: US 8,246,888 B2
(45) Date of Patent: Aug. 21, 2012

(54) SUPPORT MATERIAL FOR DIGITAL MANUFACTURING SYSTEMS

(75) Inventors: Paul E. Hopkins, Savage, MN (US); William R. Priedeman, Jr., Long Lake, MN (US); Jeffrey F. Bye, Minnetonka, MN (US)

(73) Assignee: Stratasys, Inc., Eden Prairie, MN (US)

( * ) Notice: Subject to any disclaimer, the term of this patent is extended or adjusted under 35 U.S.C. 154(b) by 198 days.

(21) Appl. No.: 12/508,725

(22) Filed: Jul. 24, 2009

(65) Prior Publication Data

US 2010/0096072 A1     Apr. 22, 2010

Related U.S. Application Data

(60) Provisional application No. 61/106,236, filed on Oct. 17, 2008.

(51) Int. Cl.
*B29C 41/02* (2006.01)
*B29C 41/42* (2006.01)

(52) U.S. Cl. .................. 264/308; 264/317; 156/155

(58) Field of Classification Search .................. 156/155; 264/308, 317
See application file for complete search history.

(56) References Cited

U.S. PATENT DOCUMENTS

| | | |
|---|---|---|
| 4,397,986 A | 8/1983 | Hornbaker |
| 4,551,369 A | 11/1985 | Belz |
| 4,671,982 A | 6/1987 | Belz |
| 4,870,148 A | 9/1989 | Belz et al. |
| 4,886,856 A | 12/1989 | Chen et al. |
| 5,121,329 A | 6/1992 | Crump |
| 5,236,812 A * | 8/1993 | Vassiliou et al. .............. 430/327 |
| 5,303,141 A | 4/1994 | Batchelder et al. |
| 5,317,043 A | 5/1994 | Gass |
| 5,322,878 A | 6/1994 | Deibig et al. |
| 5,336,755 A | 8/1994 | Pape |
| 5,340,433 A | 8/1994 | Crump |
| 5,346,955 A | 9/1994 | Sasse et al. |
| 5,378,751 A | 1/1995 | Deibig et al. |
| 5,402,351 A | 3/1995 | Batchelder et al. |
| 5,474,719 A | 12/1995 | Fan et al. |
| 5,503,785 A | 4/1996 | Crump et al. |
| 5,653,925 A | 8/1997 | Batchelder |
| 5,695,707 A | 12/1997 | Almquist et al. |
| 5,764,521 A | 6/1998 | Batchelder et al. |

(Continued)

FOREIGN PATENT DOCUMENTS

EP     0306133 A1     3/1989

(Continued)

OTHER PUBLICATIONS

U.S. Appl. No. 09/269,319 as filed, national stage entry and English language equivalent of WO 98/13423 (PCT/EP97/05273) of record.*

(Continued)

*Primary Examiner* — Yogendra Gupta
*Assistant Examiner* — Alison Hindenlang
(74) *Attorney, Agent, or Firm* — Brian R. Morrison; Westman, Champlin & Kelly, P.A.

(57) ABSTRACT

A support material feedstock comprising a first copolymer and a polymeric impact modifier, where the first copolymer includes a first monomer unit comprising a carboxyl group and a second monomer unit comprising a phenyl group.

20 Claims, 2 Drawing Sheets

U.S. PATENT DOCUMENTS

| | | | |
|---|---|---|---|
| 5,863,885 | A | 1/1999 | Ruggieri et al. |
| 5,866,058 | A | 2/1999 | Batchelder et al. |
| 5,939,008 | A | 8/1999 | Comb et al. |
| 6,022,207 | A | 2/2000 | Dahlin et al. |
| 6,067,480 | A | 5/2000 | Stuffle et al. |
| 6,070,107 | A | 5/2000 | Lombardi et al. |
| 6,129,872 | A | 10/2000 | Jang |
| 6,165,406 | A | 12/2000 | Jang et al. |
| 6,175,422 | B1 | 1/2001 | Penn et al. |
| 6,228,923 | B1 | 5/2001 | Lombardi et al. |
| 6,572,807 | B1 | 6/2003 | Fong |
| 6,645,412 | B2 | 11/2003 | Priedeman, Jr. et al. |
| 6,722,872 | B1 | 4/2004 | Swanson et al. |
| 6,790,403 | B1 | 9/2004 | Priedeman, Jr. et al. |
| 6,814,907 | B1 | 11/2004 | Comb |
| 6,907,307 | B2 | 6/2005 | Chen et al. |
| 6,923,634 | B2 | 8/2005 | Swanson et al. |
| 7,077,638 | B2 | 7/2006 | Leyden et al. |
| 7,648,609 | B2 | 1/2010 | Leder et al. |
| 2003/0090752 | A1 | 5/2003 | Rosenberger et al. |
| 2004/0222561 | A1 | 11/2004 | Hopkins |
| 2005/0004282 | A1 | 1/2005 | Priedeman, Jr. et al. |
| 2005/0103360 | A1 | 5/2005 | Tafoya |
| 2005/0129941 | A1 | 6/2005 | Comb et al. |
| 2005/0133155 | A1 | 6/2005 | Leder et al. |
| 2005/0173838 | A1 | 8/2005 | Priedeman, Jr. et al. |
| 2007/0003656 | A1 | 1/2007 | LaBossiere et al. |
| 2007/0021566 | A1 | 1/2007 | Tse et al. |
| 2007/0228590 | A1 | 10/2007 | LaBossiere et al. |
| 2008/0213419 | A1 | 9/2008 | Skubic et al. |
| 2009/0035405 | A1 | 2/2009 | Leavitt |
| 2010/0140849 | A1 | 6/2010 | Comb et al. |

FOREIGN PATENT DOCUMENTS

| | | |
|---|---|---|
| EP | 0928316 A1 | 7/1999 |
| EP | 1602688 A1 | 12/2005 |
| GB | 816016 | 7/1959 |
| GB | 1437176 | 5/1976 |
| WO | 2006022528 A | 3/2006 |

OTHER PUBLICATIONS

Partial International Search Results for International Patent No. PCT/US2009/060349.

International Search Report and Written Opinion of Counterpart Application No. PCT/US2009/060349 filed on Oct. 12, 2009.

Belland Material Brochure, Innocycling GmbH & Co. KG, Available 2006.

LOTADER AX 8840, Copolymer Ethylene-Glycidyl Methacrylate, Arkema Technical Polymers Division, (Jul. 2005), 2 pages.

LOTADER GMA, Arkema, (Jan. 2001), 2 pages.

Rudolstadt, Werk et al.: "Belland Alkaline Soluble Polymers", Belland Technology, Belland Material, pp. 1-15, Available 2006.

U.S. Appl. No. 09/269,319, filed Mar. 24, 1999, national stage entry and English language equivalent of WO 98/13423 (PCT/EP97/05273) of record.

\* cited by examiner

SUPPORT MATERIAL FOR DIGITAL MANUFACTURING SYSTEMS

CROSS-REFERENCE TO RELATED APPLICATION(S)

The present application claims priority to U.S. Provisional Application No. 61/106,236, filed on Oct. 17, 2008, and entitled "SUPPORT MATERIAL FOR DIGITAL MANUFACTURING SYSTEMS", the disclosure of which is incorporated by reference in its entirety.

BACKGROUND

The present disclosure relates to digital manufacturing systems for building three-dimensional (3D) models. In particular, the present invention relates to support materials for use with digital manufacturing systems, such as extrusion-based digital manufacturing systems.

An extrusion-based digital manufacturing system (e.g., fused deposition modeling systems developed by Stratasys, Inc., Eden Prairie, Minn.) is used to build a 3D model from a digital representation of the 3D model in a layer-by-layer manner by extruding a flowable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Support material is then deposited from a second nozzle pursuant to the generated geometry during the build process. The support material adheres to the modeling material during fabrication, and is removable from the completed 3D model when the build process is complete.

SUMMARY

An aspect of the disclosure is directed to a support material feedstock for use with a digital manufacturing system. The support material feedstock includes a copolymer having a first monomer unit comprising a carboxyl group, and a second monomer unit comprising a phenyl group. The support material feedstock also includes a polymeric impact modifier.

Another aspect of the disclosure is directed to a support material feedstock for use with a digital manufacturing system, where the support material feedstock includes a first copolymer and a second copolymer. The first copolymer includes a plurality of first monomer units comprising carboxyl groups, a plurality of second monomer units comprising phenyl groups, and a plurality of third monomer unit comprising carboxylate ester groups. The second copolymer includes a plurality of epoxy-terminated carboxylate ester groups.

A further aspect of the disclosure is directed to a method for building a three-dimensional model with a digital manufacturing system. The method includes depositing a support material into a build chamber of the digital manufacturing system using a layer-based additive technique to form a support structure, where the support material includes a first copolymer and a polymeric impact modifier, and where the first copolymer includes a plurality of first monomer units comprising carboxyl groups and a plurality of second monomer units comprising phenyl groups. The method also includes depositing a modeling material into the build chamber of the digital manufacturing system using the layer-based additive technique to form the three-dimensional model, where the three-dimensional model includes at least one overhanging region supported by the support structure. The method further includes substantially removing the support structure from the three-dimensional model with an aqueous solution.

DETAILED DESCRIPTION

Figure 1:
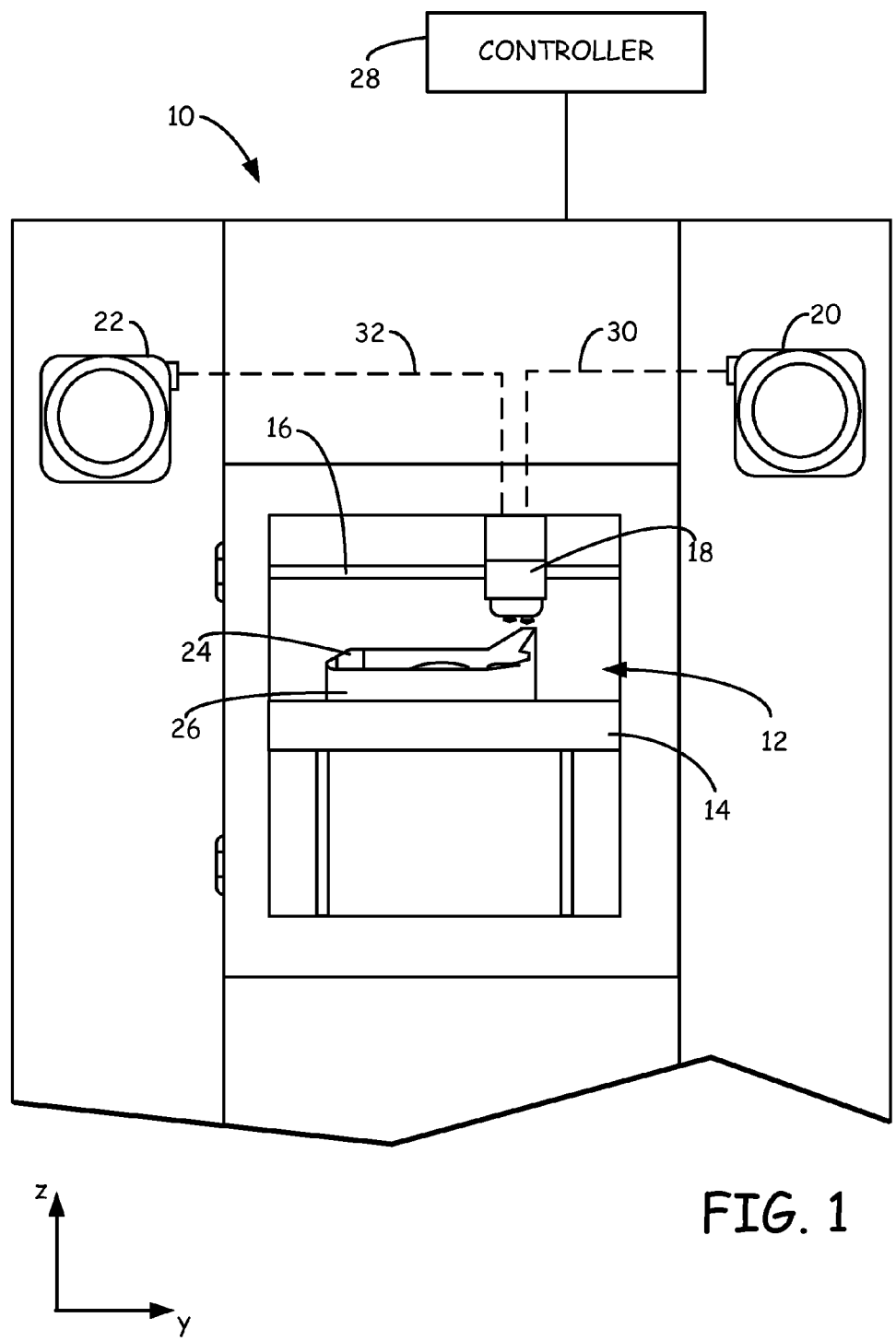
FIG. 1 is a front schematic illustration of a digital manufacturing system for building a 3D model and support structure.

As shown in FIG. 1, system 10 is a digital manufacturing system for building 3D models with the use of support structures, and includes build chamber 12, platen 14, gantry 16, extrusion head 18, and supply sources 20 and 22. Examples of suitable systems for system 10 include extrusion-based digital manufacturing systems, such as fused deposition modeling systems developed by Stratasys, Inc., Eden Prairie, Minn. Build chamber 12 is an enclosed environment that contains platen 14, gantry 16, and extrusion head 18 for building a 3D model (referred to as 3D model 24) and a corresponding support structure (referred to as support structure 26). As discussed below, support structure 26 is formed with a support material that soluble in an aqueous solution, such as an alkaline aqueous solution. This allows support structure 26 to be readily removed from 3D model 24 after a build operation is complete.

Platen 14 is a platform on which 3D model 24 and support structure 26 are built, and desirably moves along a vertical z-axis based on signals provided from computer-operated controller 28. Gantry 16 is a guide rail system that is desirably configured to move extrusion head 18 in a horizontal x-y plane within build chamber 12 based on signals provided from controller 28. The horizontal x-y plane is a plane defined by an x-axis and a y-axis (not shown in FIG. 1), where the x-axis, the y-axis, and the z-axis are orthogonal to each other. In an alternative embodiment, platen 14 may be configured to move in the horizontal x-y plane within build chamber 12, and extrusion head 18 may be configured to move along the z-axis. Other similar arrangements may also be used such that one or both of platen 14 and extrusion head 18 are moveable relative to each other.

Extrusion head 18 is supported by gantry 16 for building 3D model 24 and support structure 26 on platen 14 in a layer-by-layer manner, based on signals provided from controller 28. In the embodiment shown in FIG. 1, extrusion head 18 is a dual-tip extrusion head configured to deposit modeling and support materials from supply source 20 and supply source 22, respectively. Examples of suitable extrusion heads for extrusion head 18 include those disclosed in LaBossiere, et al., U.S. Patent Application Publication Nos. 2007/0003656 and 2007/00228590; and Leavitt, U.S. Patent Application Publication No. 2009/0035405. Alternatively, system 10 may include one or more two-stage pump assemblies, such as those disclosed in Batchelder et al., U.S. Pat. No. 5,764,521; and Skubic et al., U.S. Patent Application Publication No. 2008/0213419. Furthermore, system 10 may include a plurality of extrusion heads 18 for depositing modeling and/or support materials.

The modeling material is supplied to extrusion head 18 from supply source 20 via feed line 30, thereby allowing extrusion head 18 to deposit the modeling material to build 3D model 24. Correspondingly, the soluble support material is supplied to extrusion head 18 from supply source 22 via feed line 32, thereby allowing extrusion head 18 to deposit the support material to build support structure 26. During a build operation, gantry 16 moves extrusion head 18 around in the horizontal x-y plane within build chamber 12, and one or more feed mechanisms (not shown) are directed to intermittently feed the modeling and support materials through extrusion head 18 from supply sources 20 and 22. The received modeling and support materials are then deposited onto platen 14 to build 3D model 24 and support structure 26 using a layer-based additive technique. Support structure 22 is desirably deposited to provide vertical support along the z-axis for overhanging regions of the layers of 3D model 24. This allows 3D object 24 to be built with a variety of geometries. After the build operation is complete, the resulting 3D model 24/support structure 26 may be removed from build chamber 12, and placed in a bath containing an aqueous solution (e.g., an aqueous alkaline solution) to remove support structure 26 from 3D model 24.

The modeling and support materials may be provided to system 10 in a variety of different media. For example, the modeling and support materials may be provided as continuous filament strands fed respectively from supply sources 20 and 22, as disclosed in Swanson et al., U.S. Pat. No. 6,923,634 and Comb et al., U.S. Publication No. 2005/0129941. Examples of suitable average diameters for the filament strands of the modeling and support materials range from about 1.27 millimeters (about 0.050 inches) to about 2.54 millimeters (about 0.100 inches), with particularly suitable average diameters ranging from about 1.65 millimeters (about 0.065 inches) to about 1.91 millimeters (about 0.075 inches). Alternatively, the modeling and support materials may be provided as other forms of media (e.g., pellets and resins) from other types of storage and delivery components (e.g., supply hoppers and vessels).

The support material from supply source 22 is desirably soluble in an aqueous solution, such as an alkaline aqueous solution. The support material compositionally includes a primary copolymer having a carboxyl monomer unit and a phenyl monomer unit. More desirably, the primary copolymer includes a plurality of the carboxyl monomer units and a plurality of the phenyl monomer units, where the monomer units may be arranged in linear and/or branched arrangements along the copolymer chain. Furthermore, the monomer units are desirably arranged in periodic and/or random arrangements along the primary copolymer chain. As used herein, the term "copolymer" refers to a polymer having two or more monomer species, and includes terpolymers (i.e., copolymers having three monomer species).

The one or more carboxyl monomer units each include a carboxyl group, and may be attained from a common monomer or from a variety of different monomers. The carboxyl groups assist in rendering the primary copolymer soluble in an aqueous solution, and are particularly suitable for use with alkaline aqueous solutions. Suitable carboxyl monomer units for the primary copolymer include those with the following molecular formulas:

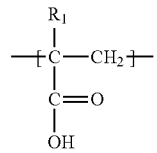

(Formula 1)

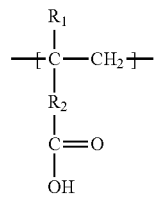

(Formula 2)

where "$R_1$" may be hydrogen (H) or an alkyl group, and where "$R_2$" may be oxygen (O) or a hydrocarbon chain. Suitable alkyl groups for "$R_1$" may have the formula $C_nH_{2n+1}$, where "n" may range from 1-3. Suitable hydrocarbon chains for "$R_2$" may have the formula $C_mH_m$, where "m" may range from 1-5. One or more of the carboxyl groups may also be neutralized with a basic compound (e.g., sodium hydroxide) to attain ionic salts from the neutralized carboxyl groups. Examples of suitable carboxyl monomer units for the primary copolymer include polymerized monomers of acrylic acid (e.g., methacrylic acid).

Suitable concentrations of the carboxyl monomer units in the primary copolymer desirably allow the primary copolymer to at least partially neutralize for solubility in an aqueous solution. Examples of suitable concentrations of the carboxyl monomer units in the primary copolymer range from about 10% by weight to about 50% by weight, with particularly suitable concentrations ranging from about 30% by weight to about 45% by weight, based on an entire weight of the primary copolymer. Furthermore, examples of suitable concentrations of the carboxyl groups (COOH) in the primary copolymer range from about 5% by weight to about 30% by weight, with particularly suitable concentrations ranging from about 10% by weight to about 20% by weight, based on an entire weight of the primary copolymer.

The one or more phenyl monomer units each include a phenyl group, and may also be attained from a common monomer or from a variety of different monomers. Suitable phenyl monomer units for the primary copolymer include those with the following molecular formulas:

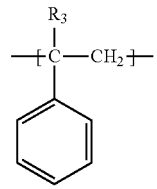

(Formula 3)

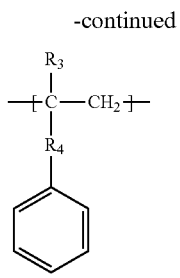

(Formula 4)

where "$R_3$" may be hydrogen (H) or an alkyl group, and where "$R_4$" may be a hydrocarbon chain. Suitable alkyl groups for "$R_3$" include those discussed above for "$R_1$", and suitable hydrocarbon chains for "$R_4$" include those discussed above for "$R_2$". Examples of suitable phenyl monomer units for the primary copolymer include polymerized monomers of an aromatic compounds such as styrene. Examples of suitable concentrations of the phenyl monomer units in the primary copolymer range from about 30% by weight to about 60% by weight, with particularly suitable concentrations ranging from about 35% by weight to about 50% by weight, based on an entire weight of the primary copolymer.

In one embodiment, the primary copolymer may also include one or more ester monomer units. The ester monomer units each include a carboxylate ester group, and may also be attained from a common monomer or from a variety of different monomers. The carboxylate ester groups desirably provide thermal and strength properties that are suitable for depositing the support material with system 10. Suitable ester monomer units for the primary copolymer include those with the following molecular formulas:

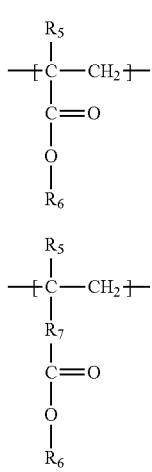

(Formula 5)

(Formula 6)

where "$R_5$" may be hydrogen (H) or an alkyl group, where "$R_6$" may be an alkyl group, and where "$R_7$" may be oxygen (O) or a hydrocarbon chain. Suitable alkyl groups for each of "$R_5$" and "$R_6$" include those discussed above for "$R_1$", and suitable hydrocarbon chains for "$R_7$" include those discussed above for "$R_2$". Examples of suitable ester monomer units for the primary copolymer include polymerized monomers of alkyl acrylate monomers. Examples of suitable concentrations of the ester monomer units in the primary copolymer range from about 5% by weight to about 40% by weight, with particularly suitable concentrations ranging from about 15% by weight to about 25% by weight, based on an entire weight of the primary copolymer.

The primary copolymer may also include additional monomer units along the backbone of the copolymer and/or at branched locations from the copolymer backbone. Suitable additional monomer units include hydrocarbon chain segments having the formula $C_pH_p$, where "p" may range from 1-10. In embodiments in which the primary copolymer includes one or more additional monomer units, examples of suitable combined concentrations of the additional monomer units in the primary copolymer range from about 1% by weight to about 30% by weight, with particularly suitable concentrations ranging from about 5% by weight to about 15% by weight, based on an entire weight of the primary copolymer.

The monomer units of the primary copolymer are desirably polymerized to attain a suitable molecular weight for extruding and handling the primary copolymer. Examples of suitable weight-average molecular weights ($M_W$) range from about 50,000 grams/mole to about 150,000 grams/mole, with particularly suitable weight-average molecular weights ($M_W$) ranging from about 75,000 grams/mole to about 110,000 grams/mole. Examples of suitable ratios of the weight-average molecular weight ($M_W$) to the number-average molecular weight ($M_N$) (i.e., $M_W/M_N$) range from about 1.5 to about 3.0, with particularly suitable $M_W/M_N$ rations range from about 2.0 to about 2.5.

Examples of suitable primary copolymers for use in the support material include copolymers of styrene, methacrylic acid, and buytl acrylate commercially available under the trade designation "BELLAND" 88140 copolymers from Innocycling GmbH & Co. KG, Rudolstadt, Germany. Examples of suitable concentrations of the one or more primary copolymers in the support material range from about 25% by weight to about 98% by weight, with particularly suitable concentrations ranging from about 50% by weight to about 95% by weight, and with even more particularly suitable concentrations ranging from about 80% by weight to about 90% by weight, based on the entire weight of the support material.

The support material also desirably includes one or more impact modifiers to increase the toughness of the support material, thereby increasing the strength of the support material feedstock and the resulting support structure. Suitable impact modifiers for use with the primary copolymer include a variety of different polymeric materials that are desirably at least partially soluble in an aqueous solution, such as an alkaline aqueous solution. Examples of suitable impact modifiers include reactive polymers, such as epoxy-functional polyolefins (e.g., polyethylenes and polypropylenes). Suitable epoxy-functional polyethylenes include copolymers of ethylene monomer units and epoxy monomer units that include epoxy-terminated carboxylate ester groups. Suitable epoxy monomer units for the impact modifier copolymer include those with the following molecular formulas:

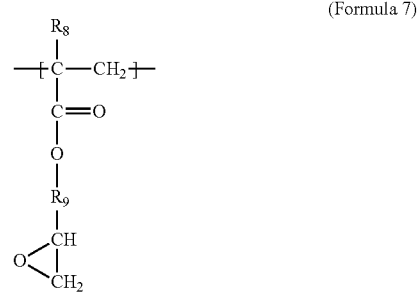

(Formula 7)

-continued

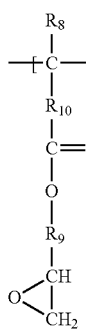

(Formula 8)

where "$R_8$" may be hydrogen (H) or an alkyl group, and where "$R_9$" and "$R_{10}$" may each be a hydrocarbon chain. Suitable alkyl groups for "$R_8$" include those discussed above for "$R_1$", and suitable hydrocarbon chains for each of "$R_9$" and "$R_{10}$" include those discussed above for "$R_2$". Examples of suitable epoxy monomer units for the copolymer include polymerized monomers of glycidyl methacrylate. Examples of suitable concentrations of the epoxy monomer units in the impact modifier copolymer range from about 1% by weight to about 20% by weight with particularly suitable concentrations ranging from about 3% by weight to about 10% by weight, based on the entire weight of the impact modifier copolymer.

The impact modifier copolymer may also include one or more additional monomer units, such as ester monomer units that include carboxylate ester groups. Suitable ester monomer units for the impact modifier copolymer include those discussed above for the ester monomer units of the primary copolymer. In embodiments in which the impact modifier copolymer includes ester monomer units, examples of suitable concentrations of the ester monomer units in the impact modifier copolymer range from about 10% by weight to about 40% by weight, with particularly suitable concentrations ranging from about 20% by weight to about 30% by weight, based on the entire weight of the impact modifier copolymer.

Examples of suitable impact modifier copolymers for use in the support material include copolymers of ethylene and glycidyl methacrylate commercially available under the trade designation "LOTADER" AX 8840 copolymer from Arkema inc., Philadelphia, Pa. Additional examples of suitable impact modifier copolymers for use in the support material include copolymers of ethylene, glycidyl methacrylate, and buytl acrylate commercially available under the trade designations "LOTADER" AX 8900 copolymer and "LOTADER" AX 8930 copolymer from Arkema inc., Philadelphia, Pa.; and "ELVALOY" PTW copolymer from E. I. du Pont de Nemours and Company, Wilmington, Del. These impact modifier copolymers may also function as plasticizers for imparting flexibility to the support material.

The average molecular weight of the impact modifier copolymer may vary depending on the particular monomer unit arrangements, and the monomer units may be arranged in periodic and/or random arrangements along the impact modifier copolymer chain. Examples of suitable concentrations of the one or more impact modifiers in the support material range from about 1% by weight to about 25% by weight, with particularly suitable concentrations ranging from about 10% by weight to about 20% by weight, based on the entire weight of the support material.

The support material may also include additional additives, such as additional plasticizers, rheology modifiers, inert fillers, colorants, stabilizers, and combinations thereof. Examples of suitable additional plasticizers for use in the support material include dialkyl phthalates, cycloalkyl phthalates, benzyl and aryl phthalates, alkoxy phthalates, alkyl/aryl phosphates, polyglycol esters, adipate esters, citrate esters, esters of glycerin, and combinations thereof. Examples of suitable inert fillers include calcium carbonate, magnesium carbonate, glass spheres, graphite, carbon black, carbon fiber, glass fiber, talc, wollastonite, mica, alumina, silica, kaolin, silicon carbide, soluble salts, and combinations thereof. In embodiments in which the support material includes additional additives, examples of suitable combined concentrations of the additional additives in the support material range from about 1% by weight to about 10% by weight, with particularly suitable concentrations ranging from about 1% by weight to about 5% by weight, based on the entire weight of the support material.

The support material desirably exhibits a melt flow index that is suitable for extrusion from extrusion head 18 and for being deposited in roads on platen 14. The melt flow index may be measured pursuant to two test standards. The first test standard is measured pursuant to ASTM D1238 with a 1.20 kilogram weight at a temperature of 230° C., and is typically used for support materials that provide support for 3D models built from acrylonitrile-butadiene-styrene (ABS) materials. Examples of suitable melt flow index values for the support material of the present disclosure under this first test standard range from about 0.1 grams/10 minutes to about 5.0 grams/10 minutes, with particularly suitable melt flow index values ranging from about 1.0 grams/10 minutes to about 2.0 grams/10 minutes.

The second test standard is measured pursuant to ASTM D1238 with a 2.16 kilogram weight at a temperature of 270° C., and is typically used for support materials that provide support for 3D models built from higher-temperature materials, such as polycarbonate/ABS blends. Examples of suitable melt flow index values for the support material of the present disclosure under this second test standard range from about 0.5 grams/10 minutes to about 25.0 grams/10 minutes, with particularly suitable melt flow index values ranging from about 5.0 grams/10 minutes to about 15.0 grams/10 minutes.

Suitable modeling materials from supply source 20 for building the 3D models (e.g., 3D model 24) may vary depending on the glass transition temperature of the support material, where the glass transition temperature of the support material affects the operational temperature of build chamber 12. Build chamber 12 is desirably heated to, and maintained at, one or more temperatures that are in a window between the solidification temperatures and the creep relaxation temperatures of the modeling and support materials. This reduces the risk of mechanically distorting (e.g., curling) 3D model 24 and support structure 26. Examples of suitable techniques for determining the creep relaxation temperatures of the modeling and support materials are disclosed in Batchelder et al., U.S. Pat. No. 5,866,058. The creep relaxation temperature of the support material is proportional to the glass transition temperature of the support material. Thus, a decrease in the glass transition temperature of the support material correspondingly decreases the creep relaxation temperature of the support material.

The above-discussed suitable compositions for the support material provide glass transition temperatures up to about 120° C. At these glass transition temperatures, build chamber 12 is desirably maintained at one or more temperatures ranging from about 85° C. to about 105° C., and more desirably between about 85° C. and about 95° C., to reduce the risk of mechanically distorting support structure 26. The modeling materials selected to build the 3D models are also desirably capable of being used within this temperature range of build chamber 12 without substantial mechanical distortions. Accordingly, suitable modeling materials for building the 3D models (e.g., 3D model 24) include any thermoplastic material capable of being extruded into build chamber 12 and solidified without substantial mechanical distortions. Examples of suitable modeling materials for building the 3D models include acrylonitrile-butadiene-styrene (ABS) copolymers, ABS-polycarbonate blends, modified variations thereof (e.g., ABS-M30 copolymers), and blends thereof.

The modeling material desirably has a creep relaxation temperature that is similar to the creep relaxation temperature of the support material, thereby allowing build chamber 12 to be heated to a suitable temperature within the above-discussed window. Examples of suitable creep relaxation temperature differences for the modeling material and the support material include differences of less than about 30° C., with particularly suitable creep relaxation temperature differences including differences of less than about 20° C., and even more particularly suitable creep relaxation temperature differences including differences of less than about 10° C.

In some embodiments, the above-discussed composition of the support material may be further combined with one or more additional materials to increase the glass transition temperature of the support material. For example, the support material composition may further include one or more soluble copolymers having higher glass transition temperatures, such as one or more methacrylic acid copolymers commercially available under the trade designation "EUDRAGIT" copolymers from Rohm and Pharma GmbH, Darmstadt, Germany. Furthermore, the support material composition may be blended with additional soluble support materials having higher glass transition temperatures. Examples of suitable additional soluble support materials include materials commercially available under the trade designation "SR-20" Soluble Support from Stratasys, Inc., Eden Prairie, Minn.; and those discussed in Priedeman et al., U.S. Patent Application Publication No. 2005/0004282. These are good soluble support material for use with 3D models built from higher-temperature materials, such as polycarbonate and polycarbonate/ABS blends.

Examples of suitable concentrations of the higher-glass transition temperature materials in the support material range from about 10% by weight to about 75% by weight, with particularly suitable concentrations ranging from about 40% by weight to about 60% by weight, based on the entire weight of the support material. In these embodiments, build chamber 12 may be maintained at one or more temperatures ranging from about 85° C. to about 135° C., thereby allowing higher-temperature modeling materials, such as polycarbonate and polycarbonate/ABS blends, to be used to build 3D models.

Figure 2:
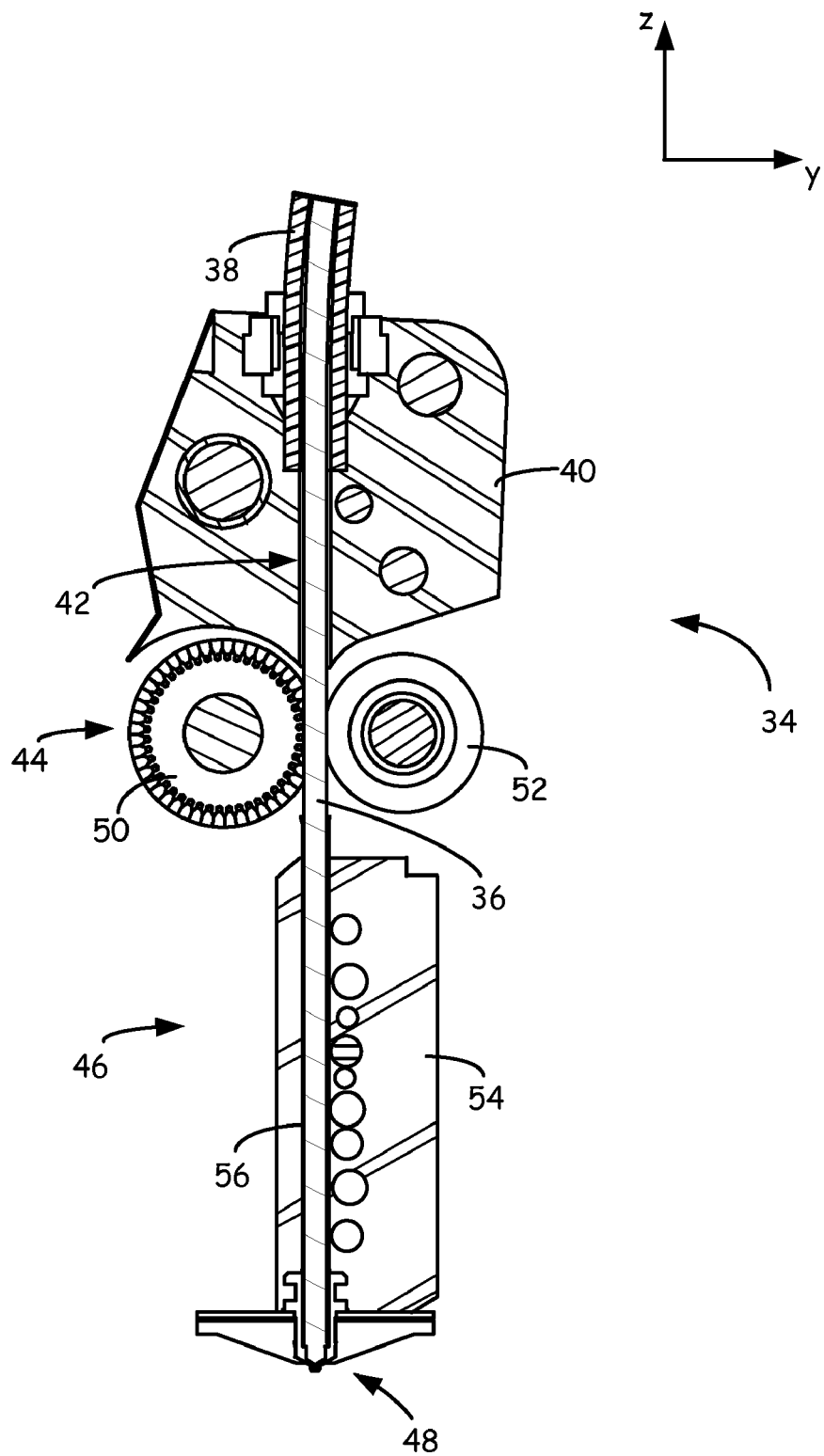
FIG. 2 is an expanded partial sectional view of a build line of an extrusion head for extruding a support material for building the support structure.

FIG. 2 is an expanded partial sectional view of extrusion line 34 of extrusion head 18 (shown in FIG. 1) for extruding a filament strand of the support material (referred to as filament 36) to build support structure 26 (shown in FIG. 1). Extrusion line 34 includes inlet tube 38, base block 40, channel 42, drive system 44, liquefier assembly 46, and build tip 48. Inlet tube 38 receives filament 36 from supply source 22 via feed line 32, as discussed above. In one embodiment, inlet tube 38 may be a component of feed line 32, and may extend to supply source 22. Filament 36 extends through inlet tube 38 and channel 42 of base block 40, thereby allowing drive system 44 to feed filament 36 into liquefier assembly 46.

Drive system 44 includes drive roller 50 and idler roller 52, which are configured to engage and grip filament 36. Drive roller 50 is desirably connected to a drive motor (not shown), which allows drive roller 50 and idler roller 52 to feed the filament into liquefier assembly 46. Liquefier assembly 46 includes liquefier block 54 and liquefier tube 56. Liquefier tube 56 is a thin-wall, thermally conductive tube extending through liquefier block 54, which has an entrance adjacent drive system 44, and an exit at build tip 48. Cooling air is desirably supplied adjacent to the entrance of liquefier tube 56 to keep the temperature of filament 36 below the glass transition temperature of the support material at the locations upstream of liquefier assembly 46. Liquefier tube 56 provides a pathway for filament 36 to travel through liquefier block 54.

Liquefier block 54 is a heating block for melting filament 36 to a desired flow pattern based on a thermal profile along liquefier block 54. Suitable maximum temperatures for the thermal profile include temperatures up to about 330° C., with particularly suitable temperatures for the thermal profile including temperatures up to about 310° C. Build tip 48 is an extrusion tip secured to liquefier assembly 46. Build tip 48 has a tip diameter for depositing roads of the modeling material, where the road widths and heights are based in part on the tip diameter. Examples of suitable tip diameters for build tip 48 range from about 250 micrometers (about 10 mils) to about 510 micrometers (about 20 mils).

The support material may be extruded through extrusion line 34 of extrusion head 18 by applying rotational power to drive roller 50 (from the drive motor). The frictional grip of drive roller 50 and idler roller 52 translates the rotational power to a drive pressure that is applied to filament 36. The drive pressure forces successive portions of filament 36 into liquefier tube 56, where the modeling material is heated by liquefier block 54 to an extrudable state. The unmelted portion of filament 36 functions as a piston with a viscosity-pump action to extrude the heated modeling material through liquefier tube 56 and build tip 48, thereby extruding the heated modeling material. The drive pressure required to force filament 36 into liquefier tube 56 and extrude the support material is based on multiple factors, such as the resistance to flow of the support material, bearing friction of drive roller 50, the grip friction between drive roller 50 and idler roller 52, and other factors, all of which resist the drive pressure applied to filament 36 by drive roller 50 and idler roller 52.

As discussed above, the support material is deposited in a predetermined pattern to build support structure 26 in a layer-by-layer manner. The temperature of build chamber 12 (shown in FIG. 1) desirably allows the deposited support material to cool to below the glass transition temperature of the support material, thereby allowing the deposited support material to retain its shape and support subsequently deposited layers. Moreover, the elevated temperature of build chamber 12 reduces the risk of mechanically distorting the deposited support material as it cools in build chamber 12.

The support material with the above-discussed composition provides support structures having good part quality and good adhesion to 3D models derived from a variety of different thermoplastic materials. The resulting support structures are desirably substantially free of warping in the horizontal x-y plane and along the vertical z-axis, thereby allowing the support structures to maintain their correct positions in the coordinate system. Furthermore, the support material exhibits high strengths and resistance to cracking and breaking. This is particularly beneficial for forming filament strands of the support material (e.g., filament 26). Such filament strands may be subjected to flexing and bending conditions during storage (e.g., on a spool) and during a build operation in system 10. The strong filament strands reduce the risk of breaking while being fed through system 10, thereby reducing the risk of interrupting the build operations, which may otherwise occur when a filament strand breaks.

As discussed above, after the build operation is complete, the resulting 3D model 24/support structure 26 may be removed from build chamber 12 and cooled to handling temperature (e.g., room temperature). The resulting 3D model 24/support structure 26 may then be immersed, sprayed with, or otherwise come in contact with an aqueous solution to remove support structure 26 from 3D model 24. Examples of suitable aqueous solutions include alkaline aqueous solutions having pHs of 7 or greater, and more desirably having pHs ranging from about 11 to about 13. As used herein, the term "solution, includes full solutions in which the solutes are fully dissolved in the aqueous solvent, and partial solutions in which the solutes are at least partially dissolved in the aqueous solvent. Suitable solutes for rendering the aqueous solution alkaline include basic compounds, such as sodium hydroxide. The aqueous solution may also be maintained at one or more elevated temperatures to assist in the removal of support structure 26. Suitable elevated temperatures for the aqueous solution range from about 60° C. to about 80° C. The aqueous solutions may also be agitated and/or subjected to ultrasonic frequencies. Additional examples of suitable aqueous solutions and corresponding solution baths are disclosed in Priedeman et al., U.S. Patent Application Publication No. 2005/0004282.

The carboxyl groups of the primary copolymer in the support material react with the basic compound (e.g., sodium hydroxide) and neutralize, thereby rendering the support structure soluble to dissolve and/or disperse into the aqueous solution. Thus, the support material of support structure 26 is desirably dissolved away from 3D model 24 until substantially all of support structure 26 is removed.

In addition to providing exhibiting a greater filament strengths, the support material of the present disclosure also dissolves substantially faster in alkaline aqueous solutions than commercially available soluble support materials. In one embodiment, the support material of the present disclosure is capable of being removed from a 3D model up to about four times faster than the soluble support material commercially available under the trade designation "SR-20" Soluble Support from Stratasys, Inc., Eden Prairie, Minn. The fast dissolve rate reduces the time required to remove the support structures from the 3D models, thereby increasing the production rates of 3D models.

Furthermore, after the support structures are removed, the resulting 3D models exhibit good part finishes with substantially no traces of the removed support structures. Accordingly, the composition containing the primary copolymer and the impact modifier provides a support material for use in digital manufacturing systems that exhibits high feedstock strengths, fast removal rates, and is suitable for use with modeling materials having a variety of glass transition temperature ranges.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

I. Examples 1-9 and Comparative Examples A and B

Support materials of Examples 1-9 and Comparative Examples A and B were prepared and analyzed for performance in a fused deposition modeling system. The fused deposition modeling system used to build 3D models and support structures in the following tests was commercially available under the trade designation "FDM 400mc" fused deposition modeling system from Stratasys, Inc., Eden Prairie, Minn.

The support materials of Examples 1-9 each included a primary copolymer and an impact modifier, where the impact modifier was blended with the primary copolymer until thoroughly mixed. Each support material was then drawn into a filament strand and wound on a spool for subsequent analysis and use in the fused deposition modeling system. For each support material of Examples 1-9, the primary copolymer was a terpolymer of styrene, methacrylic acid, and buytl acrylate commercially available under the trade designation "BELLAND" 88140 copolymer from Innocycling GmbH & Co. KG, Rudolstadt, Germany.

For the support materials of Examples 1-3, the impact modifier was a terpolymer of ethylene, glycidyl methacrylate, and buytl acrylate commercially available under the trade designation "LOTADER" AX 8930 copolymer from Arkema inc., Philadelphia, Pa. (referred to as "Lotader 8930"). For the support materials of Examples 4-6, the impact modifier was a copolymer of ethylene and glycidyl methacrylate commercially available under the trade designation "LOTADER" AX 8840 copolymer from Arkema inc., Philadelphia, Pa. (referred to as "Lotader 8840"). For the support materials of Examples 7-9, the impact modifier was a terpolymer of ethylene, glycidyl methacrylate, and buytl acrylate commercially available under the trade designation ELVALOY" PTW copolymer from E. I. du Pont de Nemours and Company, Wilmington, Del. (referred to as "Elvaloy PTW"). Table 1 provides the concentrations (percents by weight) of the impact modifiers in the support materials of Examples 1-9, where the concentrations are each based on the entire weight of the corresponding support material.

TABLE 1

| Example | Impact Modifier | Percent by Weight of Impact Modifier |
| --- | --- | --- |
| Example 1 | Lotader 8930 | 15% |
| Example 2 | Lotader 8930 | 20% |
| Example 3 | Lotader 8930 | 25% |
| Example 4 | Lotader 8840 | 10% |
| Example 5 | Lotader 8840 | 15% |
| Example 6 | Lotader 8840 | 20% |
| Example 7 | Elvaloy PTW | 10% |
| Example 8 | Elvaloy PTW | 13% |
| Example 9 | Elvaloy PTW | 16% |

The support material of Comparative Example A was a support material commercially available under the trade designation "P400" Soluble Support from Stratasys, Inc., Eden Prairie, Minn., which is a good soluble support material for use with 3D models built from ABS materials. The support material of Comparative Example B was a support material commercially available under the trade designation "SR-20" Soluble Support from Stratasys, Inc., Eden Prairie, Minn., which is a good soluble support material for use with 3D models built from higher-temperature materials, such as polycarbonate/ABS blends. In comparison to the support materials of Examples 1-9, the support materials of Comparative Examples A and B did not include primary polymers having styrene monomer units, and did not include impact modifier copolymers derived from epoxy-functional polyethylenes.

Table 2 shows the glass transition temperatures (Tg) and melt flow index (MFI) values for the support materials of Examples 1-9 and Comparatives Examples A and B. The melt flow index values were measured pursuant to ASTM D1238 under two test standards. The test standard was performed with a 1.20 kilogram (kg) weight at a temperature of 230° C., which is a standard test parameter for the support material of Comparative Example A. The second test standard was performed with a 2.16 kilogram (kg) weight at a temperature of 270° C., which is a standard test parameter for the support material of Comparative Example B.

TABLE 2

| Example | $T_g$ (° C.) | MFI (1.20 Kg/230° C.) (grams/10 min.) | MFI (2.16 kg/270° C.) (grams/10 min.) |
|---|---|---|---|
| Example 1 | 120° C. | 1.4 | 15.0 |
| Example 2 | 120° C. | 0.8 | 5.8 |
| Example 3 | 120° C. | 0.3 | 1.4 |
| Example 4 | 120° C. | 0.1 | 0.7 |
| Example 5 | 120° C. | 0.7 | 6.7 |
| Example 6 | 120° C. | 1.4 | 17.9 |
| Example 7 | 120° C. | 1.8 | 24.8 |
| Example 8 | 119° C. | 1.2 | 13.4 |
| Example 9 | 120° C. | 0.7 | 6.3 |
| Comparative Example A | 101° C. | 1.8 to 3.1 | — |
| Comparative Example B | 130° C. | — | 3.9 to 5.8 |

As shown in Table 2, the support materials of Examples 1-9 exhibited similar glass transition temperatures, which were located between the glass transition temperatures of Comparative Examples A and B. Furthermore, the melt flow index values at 1.20 kg/230° C. for the support materials of Examples 1-9 ranged from 0.1 grams/10 minutes to about 2.0 grams/10 minutes, which were generally lower than the corresponding melt flow index results for the support material of Comparative Example A. The melt flow index values at 2.16 kg/270° C. for the support materials of Examples 1-9 exhibited a large range above and below the melt flow index values for the support material of Comparative Example B.

The support materials of Examples 1-9 were also vacuum dried at a temperature of about 80° C. to determine whether the given support materials could be dried to a suitable moisture content for use in a fused deposition modeling system. The support materials of Examples 1-9 were each capable of being dried to a moisture content below about 0.04% by weight, which is a suitable moisture content attainable by the support materials of Comparative Examples A and B (each of which are suitable for use in fused deposition modeling systems).

1. Build Testing

The filaments for the support materials of Examples 1-9 and Comparative Examples A and B were each fed to the fused deposition modeling system to build support structures for a variety of test 3D models, where the 3D models were built from an ABS-M30 modeling material commercially available from Stratasys, Inc., Eden Prairie, Minn. Each support material was capable of being extruded from an extrusion head of the system to form support structures that adhered well to the 3D models. For the support materials of Examples 1-6, the liquefier exhibited a temperature profile having a maximum temperature of 300° C., and the build chamber was maintained at 95° C. For the support materials of Examples 7-9, the liquefier exhibited a temperature profile having a maximum temperature of 300° C., and the build chamber was maintained at 85° C. In comparison, the liquefier maximum temperature for the support material of Comparative Example A was 285° C., and the build chamber was maintained at 95° C. Correspondingly, the liquefier maximum temperature for the support material of Comparative Example B was 330° C., and the build chamber was maintained at 110° C.

The support materials of Examples 1-9 and Comparative Examples A and B each exhibited good adhesion to the 3D models. Each of the built parts were then placed in an agitated aqueous sodium hydroxide bath having a pH ranging from about 10 to about 12, and maintained at about 70° C. Each of the support materials dissolved away from the 3D models, and provided good surface qualities for the remaining 3D models. Accordingly, the support materials of Examples 1-9 each were capable of functioning as soluble support structures for building 3D models in the fused deposition modeling system.

In addition to the above-discussed build tests, the support materials of Examples 1-9 and Comparative Examples A and B were each measured for flatness. The flatness test involved building a template support structure from each support material at the above-discussed liquefier and build chamber temperatures. The flatness of each built support structure was then measured to determine whether the deposited support material could maintain a flat surface. The support materials of Examples 1-9 were capable of maintaining the same levels of flatness as attained by the support materials of Comparative Examples A and B.

The support materials of Examples 1-9 and Comparative Examples A and B were also measured for curling (i.e., mechanical distortions) using a 16-inch curl bar for support structures built at the above-discussed liquefier and build chamber temperatures. Table 3 provides the curl results and the build chamber temperatures for the support materials of Examples 1-9 and Comparative Examples A and B.

TABLE 3

| Example | Curl (millimeters) | Curl (inches) | Build Chamber Temperature (° C.) |
|---|---|---|---|
| Example 1 | −0.051 | −0.002 | 95° C. |
| Example 2 | 0.000 | 0.000 | 95° C. |
| Example 3 | −0.025 | −0.001 | 95° C. |
| Example 4 | 0.000 | 0.000 | 95° C. |
| Example 5 | −0.127 | −0.005 | 95° C. |
| Example 6 | −0.279 | −0.011 | 95° C. |
| Example 7 | −0.051 | −0.002 | 85° C. |
| Example 8 | 0.000 | 0.000 | 85° C. |
| Example 9 | 0.025 | 0.001 | 85° C. |
| Comparative Example A | −0.635 | −0.025 | 95° C. |
| Comparative Example B | −0.305 | −0.012 | 110° C. |

As shown in Table 3, the support materials of Examples 1-9 exhibited substantially less curling compared to the support materials of Comparative Examples A and B. In particular, the support materials of Examples 2, 4, and 8 exhibited no measurable curling. Thus, the support materials of the present disclosure are suitable for building support structures that are resistant to mechanical distortions at the given build chamber temperatures.

2. Flexibility and Strength Testing

The filaments of the support materials of Examples 1-9 and Comparative Example B were each measured for strength and flexibility by bending the filament into a simple knot and pulling the ends of the filament to reduce the dimensions of the knot. As discussed above, strength and flexibility are beneficial to reduce the risk of filament breakage while being wound on a supply spool and/or while being fed through an extrusion-based digital manufacturing system. The filaments of the support materials of Examples 1-9 were each capable of attaining simple knots smaller than about 2 inches without breaking. The 2-inch simple knot was a suitable standard to ensure that the filaments may be fed through extrusion-based digital manufacturing systems without breaking.

In comparison, the support material of Comparative Example B was typically unable to be bent more than 90 degrees without breaking. While such bendability is suitable for use in a fused deposition modeling system, the support material of Comparative Example B exhibited substantially less filament strength compared to the support materials of Examples 1-9. The increased strength of the support materials of Examples 1-9 was believed to be due to the use of the primary copolymer and the impact modifiers, which increased the toughness of the support materials.

3. Extrusion Testing

In addition to the Build Testing discussed above, several thousand feet of the filaments of the support materials of Examples 1-9 were also fed through the fused deposition modeling system to determine the operational use of the filaments over extended periods of operation. The filaments of the support materials of Examples 1-9 were each capable of being fed through the system and extruded without any breaking or clogging of the system.

4. Bead Error Testing

The filaments of the support materials of Examples 1-9 and Comparative Examples A and B were also extruded from the system in patterns to measure the deposition accuracy when the extrusion head moves around a sharp corner. During a build operation, the extrusion head moves around in a horizontal x-y plane to deposit modeling and support materials. However, when reaching a corner at which the extrusion head is required to turn (e.g., at a 90-degree corner), the extrusion head typically decelerates while traveling towards the corner, and then accelerates after passing the corner. During the corner turn, the extrusion rate of the modeling and support materials are desirably adjusted according to the deceleration and acceleration of the extrusion head, thereby desirably providing a good deposition pattern at the corner.

Accordingly, each support material was extruded at the above-discussed liquefier and build chamber temperatures while the extrusion head moved around a corner with a preset movement and extrusion profile. The error from a normal deposition path was then measured at the formed corner and a bead error score was calculated based on the measurements. A bead error score of zero represented no deviation from the normal deposition path. Table 4 shows the bead error scores attained for the support materials of Examples 1-9 and Comparative Examples A and B.

TABLE 4

| Example | Bead Error Score |
|---|---|
| Example 1 | 19 |
| Example 2 | 23 |
| Example 3 | 35 |
| Example 4 | 33 |

TABLE 4-continued

| Example | Bead Error Score |
|---|---|
| Example 5 | 21 |
| Example 6 | 14 |
| Example 7 | 9 |
| Example 8 | 13 |
| Example 9 | 18 |
| Comparative Example A | 12 |
| Comparative Example B | 30 |

As shown, the support materials of Examples 1-9 exhibited bead error scores that were similar to the those attained by the support materials of Examples A and B. Thus, the support materials of Examples 1-9 were capable of forming corners with acceptable deviations from the normal deposition path.

5. Dissolve Time Testing

Support structures were built from each of the support materials of Examples 1-9 and Comparative Examples A and B and placed in an agitated alkaline solution to measure the rate of dissolution of the support structures. The support structures each exhibited a 1-inch cubic structure of multiple columns, thereby providing interstitial voids to increase the exposed surface areas. The alkaline solution included sodium hydroxide dissolved in distilled water to attain a pH ranging from about 11 to about 13, and was maintained at a temperature of about 70° C. Each built support structure was placed in the alkaline solution and the time required to substantially dissolve and/or disperse the support structure was measured. Table 5 provides the resulting dissolve times for the support materials of Examples 1-9 and Comparative Examples A and B.

TABLE 5

| Example | Dissolve Time (minutes) |
|---|---|
| Example 1 | 35 |
| Example 2 | 75 |
| Example 3 | 165 |
| Example 4 | 135 |
| Example 5 | 90 |
| Example 6 | 35 |
| Example 7 | 35 |
| Example 8 | 38 |
| Example 9 | 75 |
| Comparative Example A | 70 |
| Comparative Example B | 147 |

As shown in FIG. 5, the support materials of Examples 1 and 6-8 exhibited dissolve rates that were about two-times as fast as the dissolve rate of the support material of Comparative Example A and about four-times as fast as the dissolve rate of the support material of Comparative Example B. Accordingly, the support materials of the present disclosure are capable of being removed from 3D models with short residence times in the alkaline aqueous solutions. As discussed above, this reduces the time required to remove the support structures from the 3D models, thereby increasing the production rates of 3D models.

II. Examples 10-15

Support materials of Examples 10-15 were also prepared and analyzed for performance in the above-discussed fused deposition modeling system. The support materials of Examples 10-12 each included a primary copolymer, an impact modifier, and an additional material, where the additional material was incorporated to increase the glass transition temperatures of the given support materials. For each support material, the impact modifier was combined with the primary copolymer until thoroughly mixed, and the additional material was then combined until thoroughly mixed. Each support material was then drawn into a filament strand and wound on a spool for subsequent analysis and use in the fused deposition modeling system.

For each support material of Examples 10-12, the primary copolymer was a terpolymer of styrene, methacrylic acid, and buytl acrylate commercially available under the trade designation "BELLAND" 88140 copolymer from Innocycling GmbH & Co. KG, Rudolstadt, Germany. For the support material of Example 10, the impact modifier was a copolymer of ethylene and glycidyl methacrylate commercially available under the trade designation "LOTADER" AX 8840 copolymer from Arkema inc., Philadelphia, Pa. (i.e., "Lotader 8840"). For the support materials of Examples 11 and 12, the impact modifier was a terpolymer of ethylene, glycidyl methacrylate, and buytl acrylate commercially available under the trade designation ELVALOY" PTW copolymer from E. I. du Pont de Nemours and Company, Wilmington, Del. (i.e., "Elvaloy PTW").

For each support material of Examples 10-12, the additional material was a methacrylic acid (MAA) copolymer commercially available under the trade designation "EUDRAGIT L100" copolymers from Rohm and Pharma GmbH, Darmstadt, Germany. Table 6 provides the concentrations (percents by weight) of the primary copolymer, the impact modifiers, and the MAA copolymer in the support materials of Examples 10-12, where the concentrations are each based on the entire weight of the corresponding support material.

TABLE 6

| Example | Percent by Weight of Primary Copolymer | Percent by Weight of Impact Modifier | Percent by Weight of MAA Copolymer | Impact Modifier |
| --- | --- | --- | --- | --- |
| Example 10 | 45.0% | 5.0% | 50.0% | Lotader 8840 |
| Example 11 | 43.5% | 6.5% | 50.0% | Elvaloy PTW |
| Example 12 | 66.3% | 8.7% | 25.0% | Elvaloy PTW |

For each support material of Examples 13-15, the primary copolymer was a terpolymer of styrene, methacrylic acid, and buytl acrylate commercially available under the trade designation "BELLAND" 88140 copolymer from Innocycling GmbH & Co. KG, Rudolstadt, Germany. Correspondingly, for each support material of Examples 13-15, the impact modifier was a copolymer of ethylene and glycidyl methacrylate commercially available under the trade designation "LOTADER" AX 8840 copolymer from Arkema inc., Philadelphia, Pa. (i.e., "Lotader 8840").

For each support material of Examples 13-15, the additional material was the support material of Comparative Example B, where the support material of Comparative Example B was also incorporated to increase the glass transition temperatures of the given support materials. As discussed above, the support material of Comparative Example B was a support material commercially available under the trade designation "SR-20" Soluble Support from Stratasys, Inc., Eden Prairie, Minn., which is a good soluble support material for use with 3D models built from higher-temperature materials, such as polycarbonate/ABS blends. Table 7 provides the concentrations (percents by weight) of the primary copolymer, the impact modifier, and the support material of Comparative Example B (referred to as "SR-20 Support Material") in the support materials of Examples 13-15, where the concentrations are each based on the entire weight of the corresponding support material.

TABLE 7

| Example | Percent by Weight of Primary Copolymer | Percent by Weight of Impact Modifier | Percent by Weight of SR-20 Support Material | Impact Modifier |
| --- | --- | --- | --- | --- |
| Example 13 | 22.5% | 2.5% | 75.0% | Lotader 8840 |
| Example 14 | 45.0% | 5.0% | 50.0% | Lotader 8840 |
| Example 15 | 67.5% | 7.5% | 25.0% | Lotader 8840 |

The filaments for the support materials of Examples 10-15 were each fed to the fused deposition modeling system to build support structures for a variety of test 3D models, where the 3D models were built from an ABS-M30 modeling material commercially available from Stratasys, Inc., Eden Prairie, Minn. Each support material was capable of being extruded from an extrusion head of the system to form support structures that adhered well to the 3D models.

Furthermore, the support material of Example 10 was also used to build a support structure for a 3D model built from a polycarbonate modeling material commercially available from Stratasys, Inc., Eden Prairie, Minn. The build chamber was maintained at a temperature of 135° C. for this build operation. Accordingly, as discussed above, the primary copolymer and impact modifier may be further blend with one or more additional materials to increase the glass transition temperature of the support material. This allows the soluble support material to be used with 3D models built from higher-temperature materials, such as polycarbonate and polycarbonate/ABS blends.

Although the present disclosure has been described with reference to preferred embodiments, workers skilled in the art will recognize that changes may be made in form and detail without departing from the spirit and scope of the disclosure.

The invention claimed is:

1. A method for building a three-dimensional model with a digital manufacturing system, the method comprising:
at least partially melting a support material in the digital manufacturing system, wherein the support material comprises a first copolymer and a second copolymer, wherein the first copolymer comprises a plurality of carboxyl monomer units derived from acrylic acid monomers, a plurality of phenyl monomer units, and a plurality of first carboxylate ester monomer units derived from first alkyl acrylate monomers, and wherein the second copolymer comprises a plurality of epoxy-terminated carboxylate ester monomer units and a plurality of second carboxylate ester monomer units derived from second alkyl acrylate monomers;
depositing the at least partially melted support material onto a platform of the digital manufacturing system using a layer-based additive technique to form a support structure;
depositing a modeling material onto the platform of the digital manufacturing system using the layer-based additive technique to form the three-dimensional model, wherein the three-dimensional model comprises at least one overhanging region supported by the support structure; and
substantially removing the support structure from the three-dimensional model with an aqueous solution.

2. The method of claim 1, wherein substantially removing the support structure from the three-dimensional model with the aqueous solution comprises immersing the support structure and the three-dimensional model into a bath of the aqueous solution.

3. The method of claim 1, wherein the aqueous solution comprises an alkaline aqueous solution.

4. The method of claim 1, wherein the platform is retained within a build chamber of the digital manufacturing system, and wherein the method further comprises maintaining the build chamber at one or more temperatures ranging from about 85° C. to about 110° C.

5. The method of claim 1, wherein the support material consists essentially of the first copolymer and the second copolymer.

6. The method of claim 1, wherein the support material further comprises a third copolymer derived from monomers comprising methyl methacrylic acid.

7. The method of claim 1, and further comprising:
feeding a filament of the support material to an extrusion head of the digital manufacturing system, wherein at least partially melting the support material in the digital manufacturing system comprises at least partially melting the support material of the filament in the extrusion head.

8. The method of claim 1, wherein the first copolymer constitutes about 80% by weight to about 90% by weight of the support material, and the second copolymer constitutes about 10% by weight to about 20% by weight of the support material, based on an entire weight of the support material.

9. A method for building a three-dimensional model with a digital manufacturing system, the method comprising:
feeding a support material to a liquefier of the digital manufacturing system, the support material comprising a first copolymer and a second copolymer, wherein the first copolymer comprises a plurality of pendant carboxyl groups having a formula COOH, a plurality of pendant phenyl groups, and a plurality of first pendant carboxylate ester groups having a formula $COOR_{(1)}$, wherein $R_{(1)}$ is a first alkyl group, and wherein the second copolymer comprises a plurality of pendant epoxy-terminated carboxylate ester groups and a plurality of second pendant carboxylate ester groups having a formula $COOR_{(2)}$, wherein $R_{(2)}$ is a second alkyl group;
at least partially melting the support material in the liquefier; and
extruding the at least partly molten support material from the liquefier; and
depositing the extruded support material onto a platform using a layer-based additive technique to build a support structure for the three-dimensional model.

10. The method of claim 9, and further comprising removing at least a portion of the support structure from the three-dimensional model with an aqueous solution.

11. The method of claim 10, wherein the aqueous solution comprises an alkaline aqueous solution.

12. The method of claim 9, wherein the first copolymer constitutes about 80% by weight to about 90% by weight of the support material, and the second copolymer constitutes about 10% by weight to about 20% by weight of the support material, based on an entire weight of the support material.

13. The method of claim 9, wherein the plurality of pendant carboxyl groups are derived from monomers comprising methacrylic acid.

14. The method of claim 9, and further comprising building the three-dimensional model from a thermoplastic material using the layer-based additive technique, wherein the three-dimensional model comprises at least one overhanging region supported by the support structure.

15. A method for building a three-dimensional model with a digital manufacturing system, the method comprising:
providing a support material to the digital manufacturing system, the support material comprising:
a first copolymer comprising:
a plurality of carboxyl monomer units each having a carboxyl group with a formula COOH;
a plurality of phenyl monomer units each having a phenyl group; and
a plurality of first ester monomer units each having a first carboxylate ester group with a formula $COOR_{(1)}$, wherein $R_1$ is a first alkyl group; and
a second copolymer comprising:
a plurality of epoxy monomer units each having an epoxy-terminated carboxylate ester group; and
a plurality of second ester monomer units each having a second carboxylate ester group with a formula $COOR_{(2)}$, wherein $R_{(2)}$ is a second alkyl group;
wherein the support material is soluble in an alkaline aqueous solution;
at least partially melting the support material in the digital manufacturing system;
depositing and cooling the at least partially melted support material to build a support structure from the support material with the digital manufacturing system using a layer-based additive technique, the support structure being built to support the three-dimensional model.

16. The method of claim 15, wherein at least a portion of the plurality of carboxyl monomer units of the first copolymer are derived from one or more acid compounds selected from the group consisting of acrylic acid, methacrylic acid, and combinations thereof, and wherein at least a portion of the first ester monomer units of the first copolymer are derived from one or more alkyl acrylate monomers.

17. The method of claim 15, wherein at least a portion of the phenyl groups of the plurality of phenyl groups are pendant phenyl groups.

18. The method of claim 15, wherein the support material further comprises a third copolymer derived from monomers comprising methyl methacrylic acid.

19. The method of claim 15, wherein the first copolymer constitutes about 80% by weight to about 90% by weight of the support material, and the second copolymer constitutes about 10% by weight to about 20% by weight of the support material, based on an entire weight of the support material.

20. The method of claim 15, and further comprising removing at least a portion of the support structure from the three-dimensional model with an alkaline aqueous solution.

* * * * *

UNITED STATES PATENT AND TRADEMARK OFFICE
CERTIFICATE OF CORRECTION

PATENT NO. : 8,246,888 B2  
APPLICATION NO. : 12/508725  
DATED : August 21, 2012  
INVENTOR(S) : Paul E. Hopkins et al.

Page 1 of 1

It is certified that error appears in the above-identified patent and that said Letters Patent is hereby corrected as shown below:

In the Claims

Column 20
Line 20, after "wherein R", insert -- ( --

Signed and Sealed this
Third Day of December, 2013

Margaret A. Focarino
*Commissioner for Patents of the United States Patent and Trademark Office*